(12) United States Patent
Stevenson

(10) Patent No.: US 11,215,121 B2
(45) Date of Patent: Jan. 4, 2022

(54) FUEL SPRAY NOZZLE

(71) Applicant: ROLLS-ROYCE plc, London (GB)

(72) Inventor: Andrew Stevenson, Derby (GB)

(73) Assignee: ROLLS-ROYCE plc, London (GB)

( * ) Notice: Subject to any disclaimer, the term of this patent is extended or adjusted under 35 U.S.C. 154(b) by 79 days.

(21) Appl. No.: 16/565,979

(22) Filed: Sep. 10, 2019

(65) Prior Publication Data

US 2020/0102888 A1   Apr. 2, 2020

(30) Foreign Application Priority Data

Sep. 28, 2018  (GB) ..................................... 1815839

(51) Int. Cl.
| | |
|---|---|
| *F02C 7/22* | (2006.01) |
| *F02C 7/232* | (2006.01) |
| *F02C 9/26* | (2006.01) |
| *F23R 3/28* | (2006.01) |
| *F02C 3/04* | (2006.01) |
| *F02C 7/36* | (2006.01) |

(52) U.S. Cl.
CPC ................ *F02C 7/222* (2013.01); *F02C 3/04* (2013.01); *F02C 7/232* (2013.01); *F02C 7/36* (2013.01); *F02C 9/263* (2013.01); *F23R 3/28* (2013.01); *F05D 2220/323* (2013.01)

(58) Field of Classification Search
CPC .... F23R 3/28; F23R 3/34; F23R 3/343; F23R 3/346; F02C 7/228; F02C 7/232; F02C 9/263; F02C 9/32; F02C 9/34; F23N 2235/16; F16K 99/0028
See application file for complete search history.

(56) References Cited

U.S. PATENT DOCUMENTS 2,953,162 A * 9/1960 Ainsworth .......... F16K 11/0708
137/625.12
5,881,550 A * 3/1999 Toelle ..................... F02C 7/232
60/39.094
(Continued)

FOREIGN PATENT DOCUMENTS

| GB | 2450515 A | 12/2008 |
|---|---|---|
| GB | 2458213 A | 9/2009 |

OTHER PUBLICATIONS

Mar. 28, 2019 Combined Search and Examination Report issued in British Application No. 1815839.4.
(Continued)

*Primary Examiner* — Alain Chau
*Assistant Examiner* — Roberto Toshiharu Igue
(74) *Attorney, Agent, or Firm* — Oliff PLC

(57) ABSTRACT

A fuel spray nozzle for a gas turbine engine, the fuel spray nozzle arranged to mix fuel and air and provide the mixture to a combustor of the engine and including: a first fuel supply conduit arranged to provide fuel to be mixed with air in a first ratio; a second fuel supply conduit arranged to provide fuel to be mixed with air in a second ratio, having a lower proportion of fuel than the first ratio; and a staging valve arranged to control the relative proportions of fuel provided through the first fuel supply conduit and the second fuel supply conduit, such that an increase or decrease in the flow in the first fuel supply conduit is accompanied by a corresponding decrease or increase in the flow in the second fuel supply conduit.

13 Claims, 9 Drawing Sheets

(56) References Cited

U.S. PATENT DOCUMENTS

| | | | |
|---|---|---|---|
| 6,955,040 B1* | 10/2005 | Myers, Jr. | F02C 7/22 |
| | | | 60/39.281 |
| 2009/0114193 A1* | 5/2009 | Cooke | F02M 59/36 |
| | | | 123/457 |
| 2009/0126802 A1* | 5/2009 | Rawlinson | F23K 5/06 |
| | | | 137/98 |
| 2010/0005776 A1 | 1/2010 | Lueck et al. | |
| 2015/0292412 A1 | 10/2015 | Rodrigues et al. | |
| 2015/0308352 A1* | 10/2015 | Kupratis | F02K 3/072 |
| | | | 60/726 |
| 2016/0177834 A1* | 6/2016 | Patel | F23R 3/346 |
| | | | 239/403 |
| 2016/0273775 A1 | 9/2016 | Griffiths et al. | |

OTHER PUBLICATIONS

Nov. 19, 2020 Office Action issued in Europoean Patent Application 19195556.6.

Jan. 24, 2020 Search Report issued in European Patent Application No. 19195556.6.

\* cited by examiner

FUEL SPRAY NOZZLE

CROSS-REFERENCE TO RELATED APPLICATIONS

This specification is based upon and claims the benefit of priority from United Kingdom patent application number GB 1815839.4 filed on Sep. 28 2018, the entire contents of which are incorporated herein by reference.

BACKGROUND

Field of the Disclosure

The present disclosure relates to a fuel spray nozzle, a fuel supply system and a gas turbine engine. In particular, but not exclusively, the present disclosure relates to a lean burn fuel spray nozzle, and a fuel supply system and gas turbine engine including lean burn fuel spray nozzles.

Description of the Related Art

In gas turbine engines, fuel is mixed with compressed air and injected into a combustion chamber by a number of fuel spray nozzles. The fuel-air mix is then burnt in the combustor, resulting in high gas temperatures which provide good thermal efficiency. However, as the gas temperature increases undesirable emissions, such as nitrogen oxides, also increase. To reduce such emissions whilst still maintaining good thermal efficiency, engines use lean burn fuel spray nozzles, which burn the fuel with a high Air-Fuel Ratio (AFR).

Typically, lean burn fuel nozzles include two separate supplies of fuel. A pilot supply is arranged to mix fuel with a similar ratio as standard engines, also referred to as rich burn, whilst the main supply provides a mixture that has an AFR higher than standard engines (i.e. proportionally less fuel).

During operation of the engine, an engine control system sets the proportion of the fuel sent to the pilot burners and the main burners. The pilot supply is always flowing and is never completely shut off. For example, the engine is started on 100% pilots and remains in this condition until idle is achieved. As engine power is increased, the combustor flame temperature also increases which increases the generation of nitrogen oxides. At a particular flame temperature threshold, the engine control system varies the split of fuel between the pilot burners and main burners, so that the mains burners are staged in to provide a pilot:mains fuel split with proportions of typically 70:30. As engine power continues to be increased, the engine control system provides increasing amounts of the fuel into the mains burners so that at the cruise condition and higher i.e. take off, a pilot:mains fuel split with proportions of 20:80 is typically used.

In some cases, gas turbine engines including lean burn fuel nozzles are provided with a splitter valve that is mounted on the engine core or fan case. The splitter valve provides fuel to a pilot manifold and a main manifold, which in turn feed the pilot supply and main supply of all of the fuel spray nozzles. Each fuel spray nozzle is provided with a variable scheduling valve on its main supply only, actuated by the differential fuel pressure across it.

SUMMARY

According to a first aspect there is provided a fuel spray nozzle for a gas turbine engine, the fuel spray nozzle arranged to mix fuel and air and provide the mixture to a combustor of the engine and including: a first fuel supply conduit arranged to provide fuel to be mixed with air in a first ratio; a second fuel supply conduit arranged to provide fuel to be mixed with air in a second ratio, having a lower proportion of fuel than the first ratio; and a staging valve arranged to control the relative proportions of fuel provided through the first fuel supply conduit and the second fuel supply, such that an increase or decrease in the flow in the first fuel supply conduit is accompanied by a corresponding decrease or increase in the flow in the second fuel supply conduit.

An increase in the flow through the first fuel supply conduit is accompanied by a decrease in the flow through the second fuel supply conduit. Conversely, a decrease in the flow through the first fuel supply conduit is accompanied by an increase in the flow through second fuel supply conduit.

The staging valve is formed as part of the fuel spray nozzle. Therefore, a single manifold can supply fuel to both the main and pilot supplies of the nozzle, reducing the complexity of an engine using the nozzle. Furthermore, because increasing or decreasing the flow to one of the pilot or main supplies is accompanied by a corresponding decrease or increase in the other flow, a total flow from the nozzle (the total of the main and pilot flows) is kept approximately constant for all positions of the valve. Therefore, if a valve fails and sticks at a particular position, the total flow from the nozzle is unaffected. Therefore, the faulty nozzle provides the same overall flow, even when other nozzles are switched to different splits between the main and pilot supplies. This prevents a sector to sector mal-distribution of fuel to the combustor, preventing hot spots in the combustor, which can cause damage to the turbine, downstream of the combustor.

The staging valve may be arranged to control the relative proportions of fuel provided through the first fuel supply conduit and the second fuel supply conduit, to maintain a total flow of fuel as constant or substantially constant The staging valve may comprise a first fuel flow path between a valve inlet for receiving fuel and the first fuel supply conduit. The first fuel flow path may have a first control region having a first cross-sectional area through which fuel flows. The staging valve may also comprise a second fuel flow path between the valve inlet and the second fuel supply conduit. The second fuel flow path may have a second control region having a second cross-sectional area through which fuel flows. The staging valve may include a first closing member arranged to vary the first cross-sectional area; and a second closing member arranged to vary the second cross-sectional area.

The first and second closing members may be linked such that actuating the valve to increase the first cross-sectional area is accompanied by a corresponding reduction in the second cross-sectional area, and actuating the valve to decrease the first cross-sectional area is accompanied by a corresponding increase in the second cross-sectional area.

The first closing member may be actuable across a first range of movement to vary the first cross-sectional area, and the second closing member may be actuable across a second range of movement to vary the second cross-section area.

The fuel spray nozzle may include a first chamber between the valve inlet and the first fuel supply conduit. The first chamber may define the first control point and may receive the first closing member. The first chamber may have one or more first inlet ports coupled to the valve inlet, and one or more first outlet ports coupled to the first fuel supply conduit. The fuel spray nozzle may include a second chamber between the valve inlet and the second fuel supply conduit. The second chamber may define the second control point and may receive the second closing member. The second chamber may have one or more second inlet ports coupled to the valve inlet, and one or more second outlet ports coupled to the second fuel supply conduit. The first closing member may be arranged to vary the first cross-sectional area by opening and closing the first inlet ports and/or the first outlet ports. The second closing member may be arranged to vary the second cross-sectional area by opening and closing the second inlet ports and/or the second outlet ports.

The fuel spray nozzle may include a valve body defining a cavity; and a dividing member splitting the cavity into two parts, forming the first and second chambers.

The fuel spray nozzle may include a linking member rigidly joining the first closing member and the second closing member. The dividing member may be formed on the linking member.

The first and second closing members may be arranged such that the same number of ports is open, over the range of movement of the first and second closing members.

The first and second closing members may be arranged to vary the first and second cross-sectional areas by opening or closing the one or more first and second inlet ports. The number of the first and second outlet ports that are open may be constant as the number of the first and second inlet ports that are open varies, over at least part of the range of movement of the first and second closing members.

The first and second closing members may be arranged to vary the first and second cross-sectional areas by opening or closing the one or more first and second outlet ports. A number of the first and second inlet ports that are open may be constant as the number of the first and second outlet ports that are open varies, over at least part of the range of movement of the first and second closing members The first fuel supply conduit may be split into one or more first sectors, each first sector associated with one or more first outlet port. The second fuel supply conduit may be split into one or more second sectors, each second sector associated with one or more second outlet port. The first and second closing members may be arranged to maintain a constant number of sectors open at any position of the first and second closing members. Each sector may comprise a plurality of ports distributed around a circumference of the fuel spray nozzle.

The staging valve may be actuable to modify the proportions of the flow through the first fuel supply conduit and the second fuel supply conduit between ratios of 100:0 and 10:90. During typical operation, the staging valve may be actuated to modify the proportions of the flow through the first fuel supply conduit to the flow through the second fuel supply conduit between ratios of 100:0 and 20:80.

According to a second aspect, there is provided a fuel supply system for a gas turbine engine, the fuel supply system including: two or more fuel spray nozzles according to the first aspect; and a fuel manifold arranged to deliver fuel to the first fuel supply conduits and second fuel supply conduits of the fuel spray nozzles.

The staging valve is formed as part of the fuel spray nozzles. Therefore, a single manifold can supply fuel to both the main and pilot supplies of the nozzles, reducing the complexity of the system. Furthermore, because increasing or decreasing the flow to one of the pilot or main supplies in each nozzle is accompanied by a corresponding decrease or increase in the other flow, a total flow from each nozzle in the system is kept approximately constant for all positions of the valves. Therefore, if a valve fails and sticks at a particular position, the total flow from the nozzle is unaffected. Therefore, the faulty nozzle provides the same overall flow, even when other nozzles in the system are switched to different splits between the main and pilot supplies. This prevents a sector to sector mal-distribution of fuel to the combustor, preventing hot spots in the combustor, which can cause damage to the turbine downstream of the combustor.

The fuel supply system may include a metering valve arranged to control the total flow of fuel into the manifold.

According to a third aspect, there is provided a gas turbine engine for an aircraft comprising: an engine core comprising a compressor arranged to compress air passing through the engine core, a combustor arranged to burn fuel in the compressed air, a turbine driven by expansion of combustion products from the combustor and a core shaft connecting the turbine to the compressor, to drive the compressor; a fan located upstream of the engine core, the fan driven by the core shaft and comprising a plurality of fan blades; and a fuel supply system according to the second aspect, arranged to mix fuel with compressed air from the compressor, and deliver the mixture to the combustor.

The staging valve is formed as part of the fuel spray nozzles. Therefore, a single manifold can supply fuel to both the main and pilot supplies of the nozzles, reducing the complexity of the engine. Furthermore, because increasing or decreasing the flow to one of the pilot or main supplies in each nozzle is accompanied by a corresponding decrease or increase in the other flow, a total flow from each nozzle in the system is kept approximately constant for all positions of the valves. Therefore, if a valve fails and sticks at a particular position, the total flow from the nozzle is unaffected. Therefore, the faulty nozzle provides the same overall flow, even when other nozzles in the engine are switched to different splits between the main and pilot supplies. This prevents a sector to sector mal-distribution of fuel to the combustor, preventing hot spots in the combustor, which can cause damage to the turbine downstream of the combustor.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
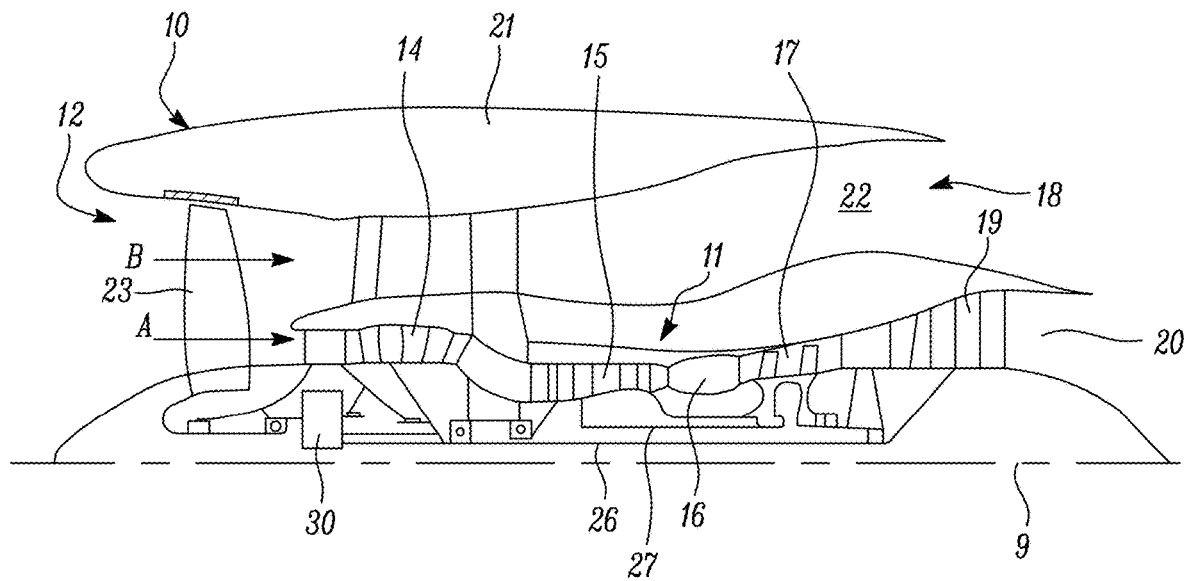
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
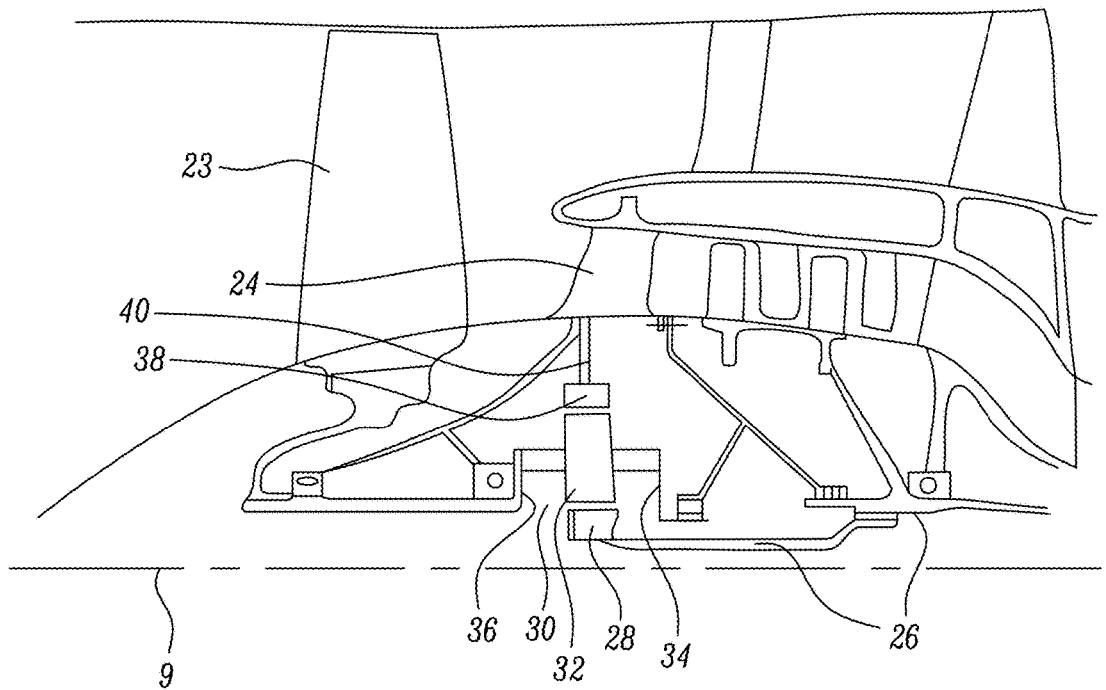
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
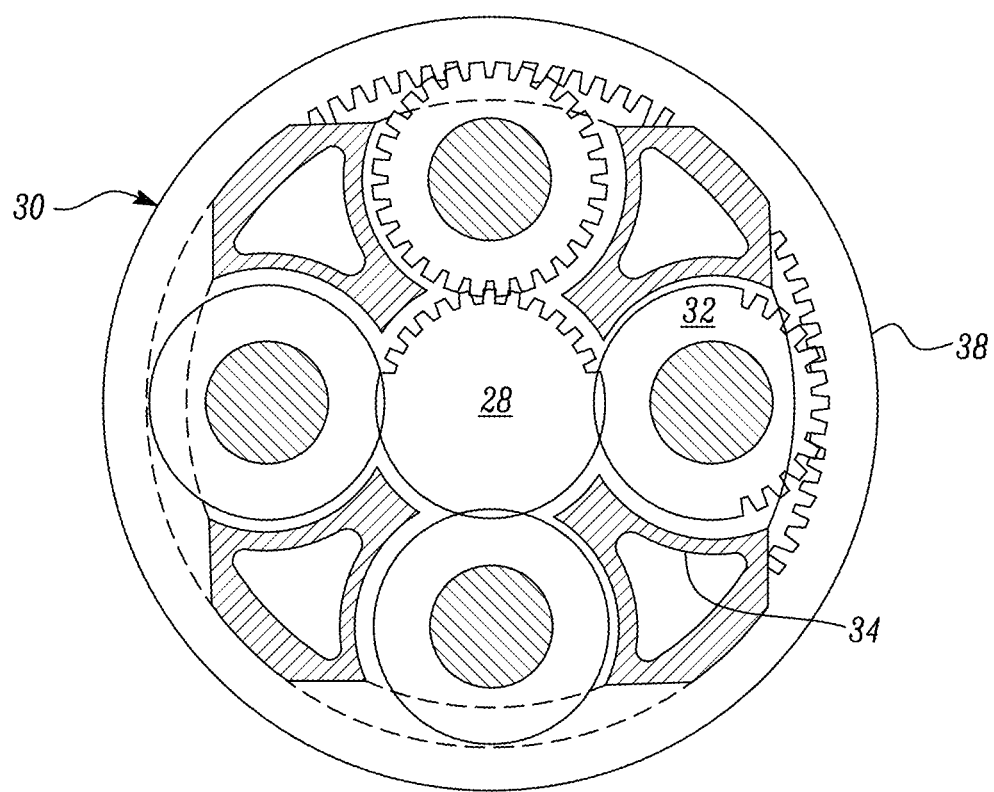
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
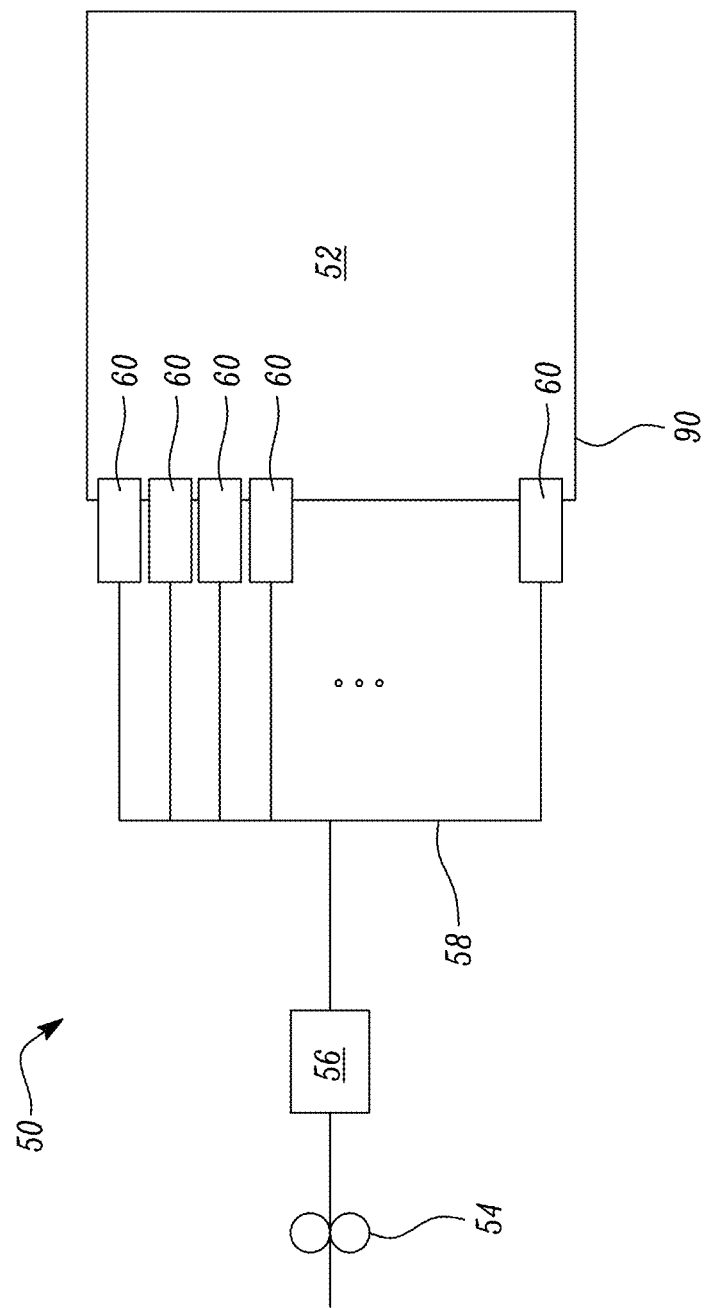
FIG. 4 schematically illustrates a fuel distribution system of the gas turbine engine of FIG. 1.

FIG. 4 schematically illustrates a fuel distribution system 50 for supplying fuel from a reservoir or source (not shown) to the combustion chamber 52 (also referred to as the combustor) of a gas turbine engine 10.

The fuel distribution system 50 includes a pump 54 to circulate fuel around the engine 10. Via a metering valve 56, which controls the flow of fuel in the system 50, the pump 54 delivers fuel into a fuel manifold 58, which in turn provides fuel to an array of fuel spray nozzles 60. In one example, there may be 17 or 18 fuel spray nozzles 60.

The fuel spray nozzles 60 mix the fuel with compressed air from the second (high pressure) compressor stage 15 of the engine core 11, to atomise the fuel, and inject the fuel into the combustion chamber 52. The fuel spray nozzles 60 and combustion chamber 52 form the combustion equipment 16. The combustion chamber 52 has a wall 90.

FIG. 4 illustrates the system schematically. In practice, the combustion chamber 52 may be circular or annular in cross-section, extending around the principal axis 9, and having a length extending along it. The fuel spray nozzles 60 are arranged at or near the upstream end of the chamber 52, around the circumference of the combustion chamber 52, to ensure an even distribution of fuel in the chamber 52. As such, the manifold 58 is also at least partially annular. For example, the manifold 58 may be in the form of a continuous loop or horseshoe shape extending circumferentially around the principal axis 9, with one or more feed pipes extending to the loop from the metering valve 56.

Figure 5:
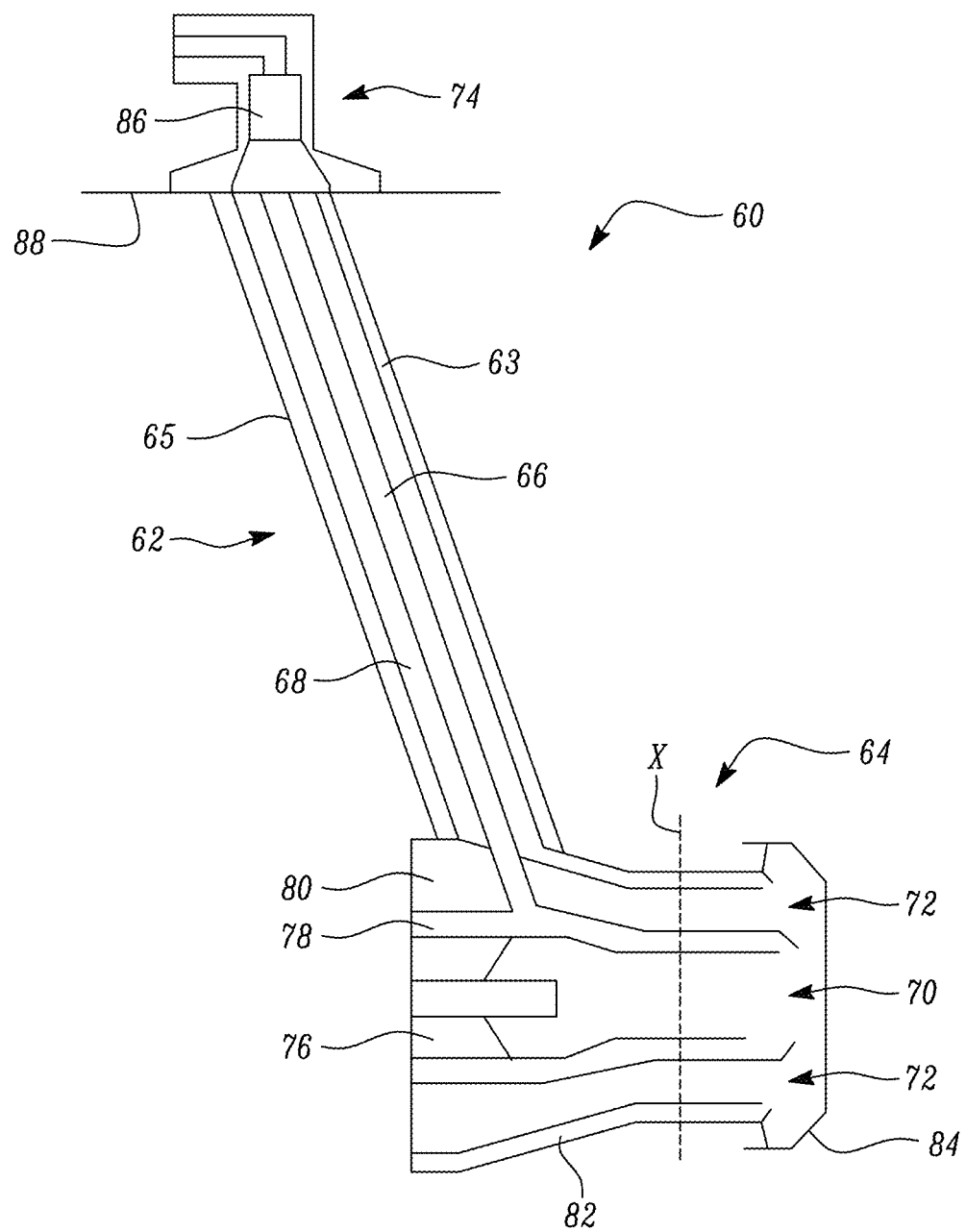
FIG. 5 schematically illustrates a fuel spray nozzle of the fuel distribution system of FIG. 4.

FIG. 5 illustrates an example of one of the fuel nozzles 60 from the fuel supply system 50 discussed above. The fuel spray nozzles 60 are lean burn fuel spray nozzles, providing two different supplies of fuel from the manifold 58.

The fuel spray nozzle 60 includes a feed arm 62 and a nozzle head 64. The feed arm 62 delivers fuel from the manifold 58 to the nozzle head 64, through fuel supply pipes/conduits 66, 68. The feed arm 62 may include a heat shield air gap 63, formed by a housing 65.

The nozzle head 64 mixes the fuel with air from the compressor stages 14, 15 and delivers the mixture into the combustion chamber 52 as an atomised spray. The nozzle head 64 may also include heat shielding (not shown).

The first fuel supply pipe 66 is for delivering fuel to a pilot burner 70 within nozzle head 64, and the second fuel supply pipe 68 is for delivering fuel to a main burner 72 in the nozzle head 64. In the example shown, the first fuel supply pipe 66 is arranged concentrically within the second fuel supply pipe 68.

A connector 74 is used to couple the fuel spray nozzle 60 to the manifold 58. In the assembled engine 10, the fuel spray nozzle 60 may be secured to a support 88 by the connector 74. The nozzle head 64 may also be secured to a wall 90 of the combustion chamber 52.

The nozzle head 64 is substantially cylindrical, extending along an axial direction at an angle to the feed arm 62. Within the nozzle head 64, a first air passage 76 extends substantially centrally. Around the first air passage 76, a first annular fuel passage 78 is formed. The first annular fuel passage 78 is connected to the first fuel supply pipe 66 to provide the fuel supply of the pilot burner 70.

A second air passage 80 is provided concentrically around the outside of the first annular fuel passage 78, and a second annular fuel passage 82 is provided around the outside of the second air passage 80. The second annular fuel passage 82 is connected to the second fuel supply pipe 68 to provide the fuel supply of the main burner 72.

Each of the air passages 76, 80 receives air from the compressor stages 14, 15 of the engine 10. The air passages 76, 80 include swirler vanes (not shown) to impart turbulence to the air. Similarly, the annular fuel passages 78, 82 also include swirler vanes (not shown) to impart turbulence to the fuel. A swirler head 84 may be provided on the outside of the second annular fuel passage 82 to provide further air to the main burner 72.

In use, air from the air passages 76, 80 is mixed with fuel from the fuel passages 78, 82 to provide atomised fuel, to inject into the combustion chamber 52. The meter valve 56 can control the total flow of fuel into the manifold 58. A staging valve 86 provided in the connector 74 controls the division of fuel between the pilot burner 70 and main burner 72.

It will be appreciated that the nozzle head 64 may be considered as two concentrically arranged burners 70, 72.

The pilot burner 70 is arranged to mix fuel with air in a similar air to fuel ratio as standard (rich burn) engines, whilst the main burner 72 mixes fuel and air with a higher air to fuel ratio (i.e. a lower proportion of fuel). Typically, at least some of the fuel is provided to the pilot burner 70 at all times. The relative proportions of the fuel provided to the pilot burner 70 and main burner 72 is varied depending on environmental conditions and the mode of operation of the engine. For example, the proportion of fuel provided to the pilot burner 70 is increased in circumstances, such as engine ignition, take-off, ascent, descent, idle or particular environment conditions. In some circumstances, 100% of fuel may be provided to the pilot burner 70. A mixture of the main burner 72 and pilot burner 70, with varying contribution from the pilot burner 70, is used at other times. For example at cruise, the ratio of the fuel supplied by the pilot supply to the fuel supplied by the mains supply may be 20:80. The staging valve 86 controls the division of fuel between the pilot burner (70) and the main burner (72).

Figure 6A:
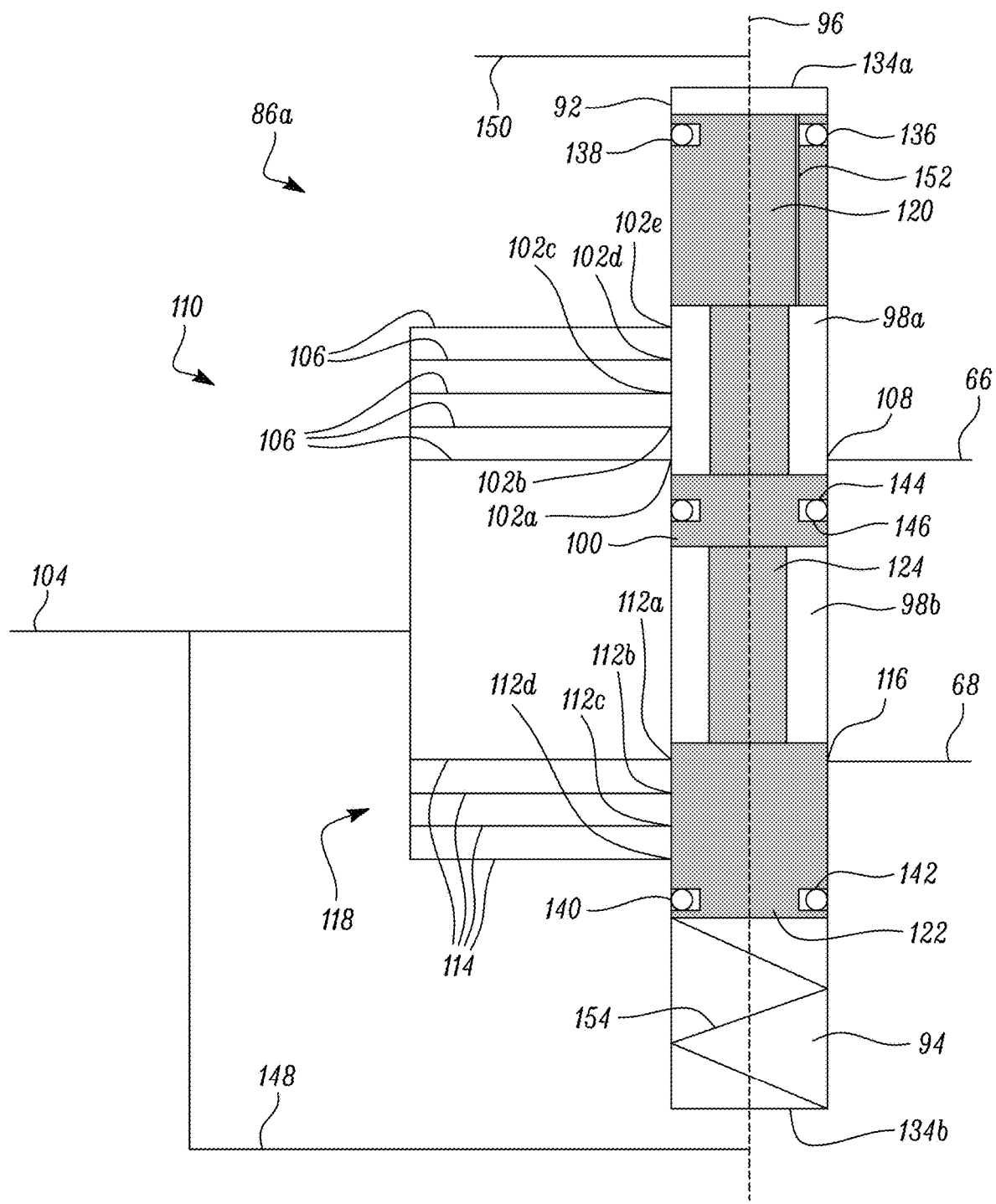
FIG. 6A illustrates a first example of the staging valve of the nozzle of FIG. 5, in a first position.
Figure 6B:
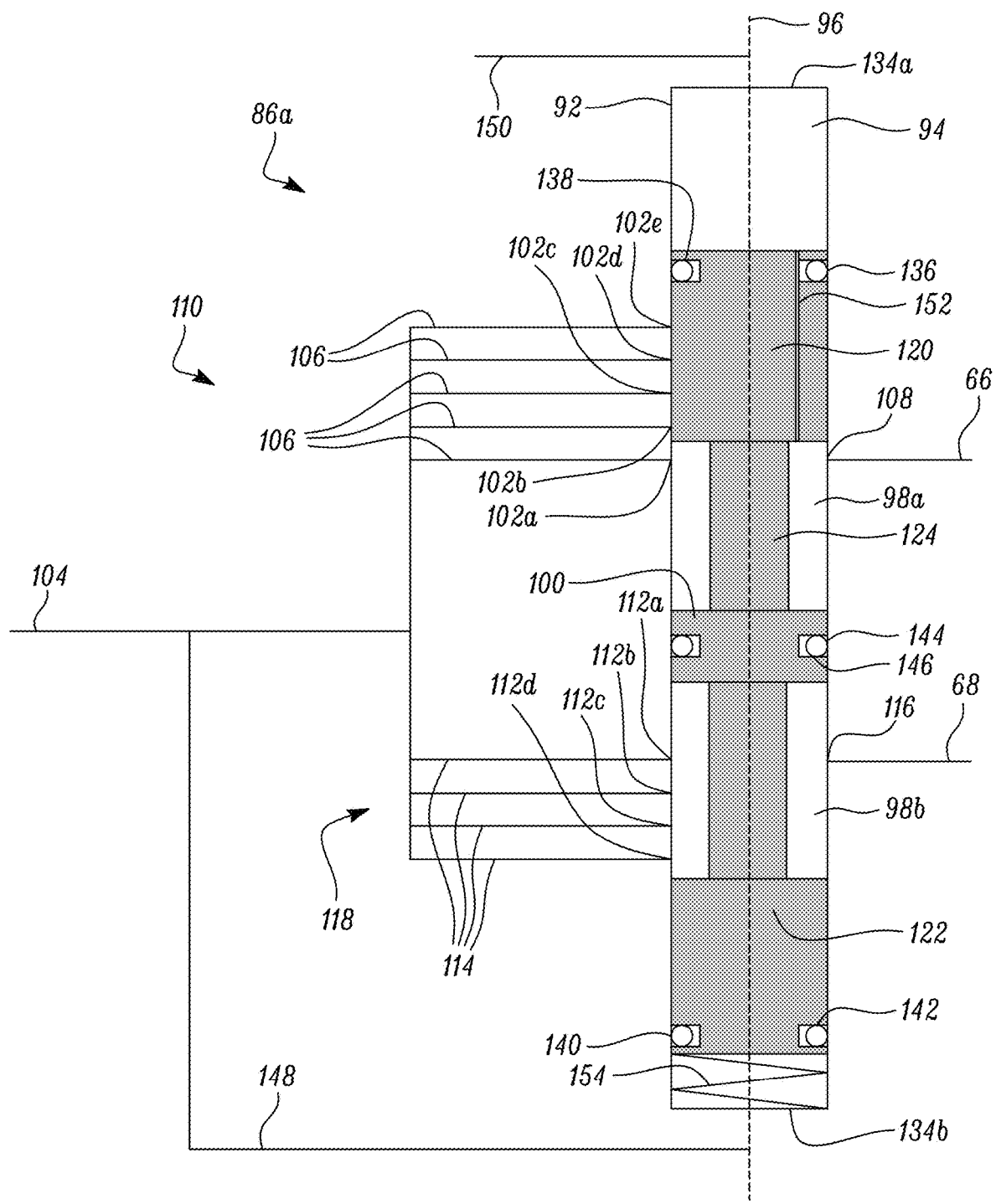
FIG. 6B illustrates the first example of the staging valve of the nozzle of FIG. 5, in a second position.

FIGS. 6A and 6B schematically illustrate a first example of the staging valve 86a. The staging valve 86a has a valve body 92 which defines a cavity 94 through which the fuel flows. The cavity 94 is cylindrical in shape, having a length extending along an axial direction 96 from a first (top) end 134a to a second (bottom) end 134b, and a circular cross section perpendicular to the axial direction 96.

The valve 86a includes a number of inlet ports 102, 112 arranged in the axial valve body 92 along the axial direction 96. Five inlet ports 102a-e are grouped together to form a set of pilot inlet ports 102, and another four inlet ports 112a-d are grouped together to form a set of main inlet ports 112. The pilot inlet ports 102a-e are in fluid communication with a valve inlet 104 through corresponding first fuel passages 106 and the main outlet ports 108a-d are in fluid communication with the valve inlet through corresponding second fuel passages 114.

The pilot inlet ports 102 are spaced from the first end 134a of the cavity 94 in the axial direction 96, and the main inlet ports 112 are spaced from the second end 134b of the cavity 94 in the axial direction 96. The pilot inlet ports 102 and the main inlet ports 112 are also spaced from each other along the axial direction 96.

A pilot outlet port 108 from the cavity 94 is coupled to the first fuel supply conduit 66 of the nozzle 60. The pilot outlet port 108 is in a diametrically opposed position to the pilot inlet ports 102a-e, around the cavity 94. Along the axial direction 96, the pilot outlet port 108 is aligned with the pilot inlet port 102a farthest from the first end 134a of the cavity 94.

A main outlet port 116 from the cavity 94 is coupled to the second fuel supply conduit 68 of the nozzle 60. The main outlet port 116 is in a diametrically opposed position to the main inlet ports 112a-d, around the cavity 94. Along the axial direction 96, the main outlet port 116 is aligned with the main inlet port 112a farthest from the second end 134b of the cavity 94.

A first closing member 120 is provided in the cavity 94 in the region of the pilot inlets ports 102 and pilot outlet port 108. A second closing member 122 is also provided in the cavity 94 in the region of the main inlets ports 112 and main outlet port 116. The first and second closing members 120, 122 are joined by a rigid linking member 124, extending parallel to the axial direction 96. A collar 100 is also provided on the linking member 124, between and axially spaced from the first and second closing members 120, 122.

Each of the closing members 120, 122 and the collar 100 are sized to form a tight sliding fit in the cavity 94 perpendicular to the axial direction 96, whilst still allowing movement of the closing members 120, 122 in the axial direction 96. A first annular seal 136 is provided in an annular seat 138 formed in the first closing member 120. The tight fit and the seal 136 ensures no fuel can pass by the first closing member 120 in the axial direction 96. Similarly, a second annular seal 140 is provided in an annular seat 142 formed in the second closing member 122. The tight fit and the seal 140 ensures no fuel can pass by the second closing member 122 in the axial direction 96.

A third annular seal 144 is also provided in an annular seat 146 formed in the collar 100. Similarly, with the seals 136, 140 in the closing members 120, 122, the tight fit and seals 144 in the collar 100 ensures that no fuel can pass by the collar 100 in the axial direction 96.

The collar 100 divides the cavity 94 into two separate chambers 98a, b. A first chamber 98a is formed between the pilot inlet ports 102a-e and the pilot outlet port 108, and a second chamber 98b is formed between the main inlet ports 112a-d and the main outlet port 116. No fluid can pass from the first chamber 98a to the second chamber 98b due to the collar 100 and seal 144, and the first chamber 98a is completely sealed from the second chamber 98b.

In order to fully seal the first chamber 98a from the second chamber 98b, the third seal 144 may be a simple dynamic seal. Alternatively, improved sealing between the chambers may be provided by using a step shaped face seal on the collar 100. Instead of or as well as a step shaped face seal, the collar 100 may be arranged to be larger than the rest of the valve 86. In further examples, any suitable seal may be used.

The first fuel passages 106, pilot inlets 102a-e, first chamber 98a, and pilot outlet 108 define a first fuel flow path 110 between the valve inlet 104 and the first fuel supply conduit 66. The second fuel passages 114, main inlet ports 112a-d, second chamber 98b, and main outlet port 116 define a second fuel flow path 118 between the valve inlet 104 and the second fuel supply conduit 68. After the valve inlet 104, the flow paths 110, 118 have no fluid communication between them.

The first closing member 120 and second closing member 122 are arranged to move along the axial direction 96. Due to the rigid linking member 124, the movement of the closing members 120, 122 in the axial direction 96 is linked such that when one of the closing members 120, 122 moves, the other also moves, as does the collar 100.

As the first closing member 120 moves over its range of movement, it may block off or open one or more of the pilot inlet ports 102a-e, to vary the flow of fuel along the first fuel flow path 110. Similarly, as the second closing member 122 moves over its range of movement, it may block off or open one or more of the main inlet ports 112a-d, to vary the flow of fuel along the second fuel flow path 118.

Therefore, the first and second chambers 98a, b may be considered as control regions for varying the flow to the first and second supply conduits 66, 68, and thus to the pilot burner 70 and main burner 72 of the nozzle 60. The control regions can vary the restriction, or cross-section area, through which the fuel flows.

As the first closing member 120 moves to open the pilot inlet ports 102, the second closing member 122 moves to close the main inlet ports 112. Similarly, as the first closing member 120 moves to close the pilot inlet ports 102, the second closing member 122 moves to open the main inlet ports 122. Therefore, increasing or decreasing the flow through one of the fuel flow paths 110, 118 causes an opposite (or corresponding complementary) change in the flow in the other path 118, 110.

The size and spacing of the pilot inlet openings 102 is the same as the size and spacing of the main inlet openings 112 and so the flow through each inlet 102a-e, 112a-d is the same. Therefore, as the closing members 102, 122 move, the same number of inlet ports 102a-e, 112a-d is always open and the overall flow (and hence the flow number or overall restriction) through the valve 86a is constant. However, the relative proportions of the flow to the first fuel supply conduit 66 and second fuel supply conduit 68 varies.

There are a number of different control parameters associated with the size and shape of the closing members 120, 122, collar 100 and chambers 98a, b that can determine the range of flow possible through the valve 86a. These include:

Axial spacing of the pilot inlet ports 102 from the first end 134a of the cavity 94;

Axial spacing of the main inlet ports 112 from the second end 134b of the cavity 94;

Axial spacing between the pilot inlet ports 102 and the main inlet ports 112;

Axial length of the first closing member 120;

Axial length of the second closing member 122;

Axial length of the collar 100;

Axial spacing between the first closing member 120 and collar 100; and

Axial spacing between the second closing member 122 and collar 100.

By choice of these control parameters At least one of the pilot inlet ports 102a, and the pilot outlet port 108 is always open, such that there is always flow to the pilot burner 70. However, the flow to the main burner 72 can range between all inlet ports 112 closed, and all inlet ports 112 open.

A bypass conduit 148 is provided between the valve inlet 104 and the second end 134b of the cavity 94. The bypass conduit 148 prevents hydraulic lock from occurring as the closing member 122 moves axially downwards towards the second end 134b of the cavity 94. The bypass conduit 148 allows the fuel in the cavity 98b to be displaced, so the closing member 122 can move.

Using the examples shown in FIGS. 6A and 6B, with five pilot inlet openings 102a-e and four main inlet openings 112a-d, the valve may be operated between the following configurations:

|   | Pilot inlet ports open | Main inlet ports open | Relative flow to pilot burner | Relative flow to main burner | FIG. |
|---|---|---|---|---|---|
| A | 5 | 0 | 100 | 0 | 6A |
| B | 4 | 1 | 80 | 20 |   |
| C | 3 | 2 | 60 | 40 |   |
| D | 2 | 3 | 40 | 60 |   |
| E | 1 | 4 | 20 | 80 | 6B |

Figure 7A:
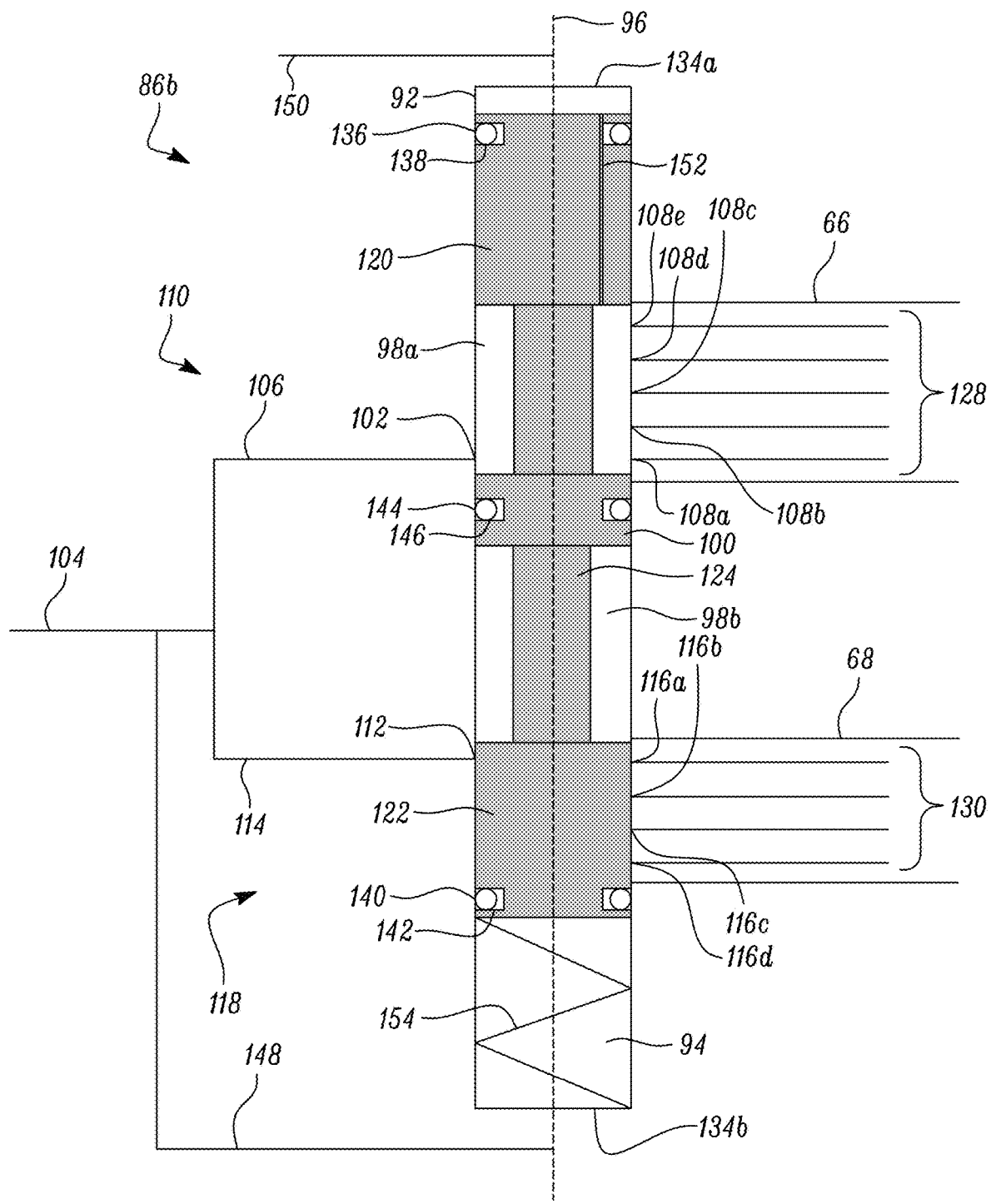
FIG. 7A illustrates a second example of the staging valve of the nozzle of FIG. 5, in the first position.
Figure 7B:
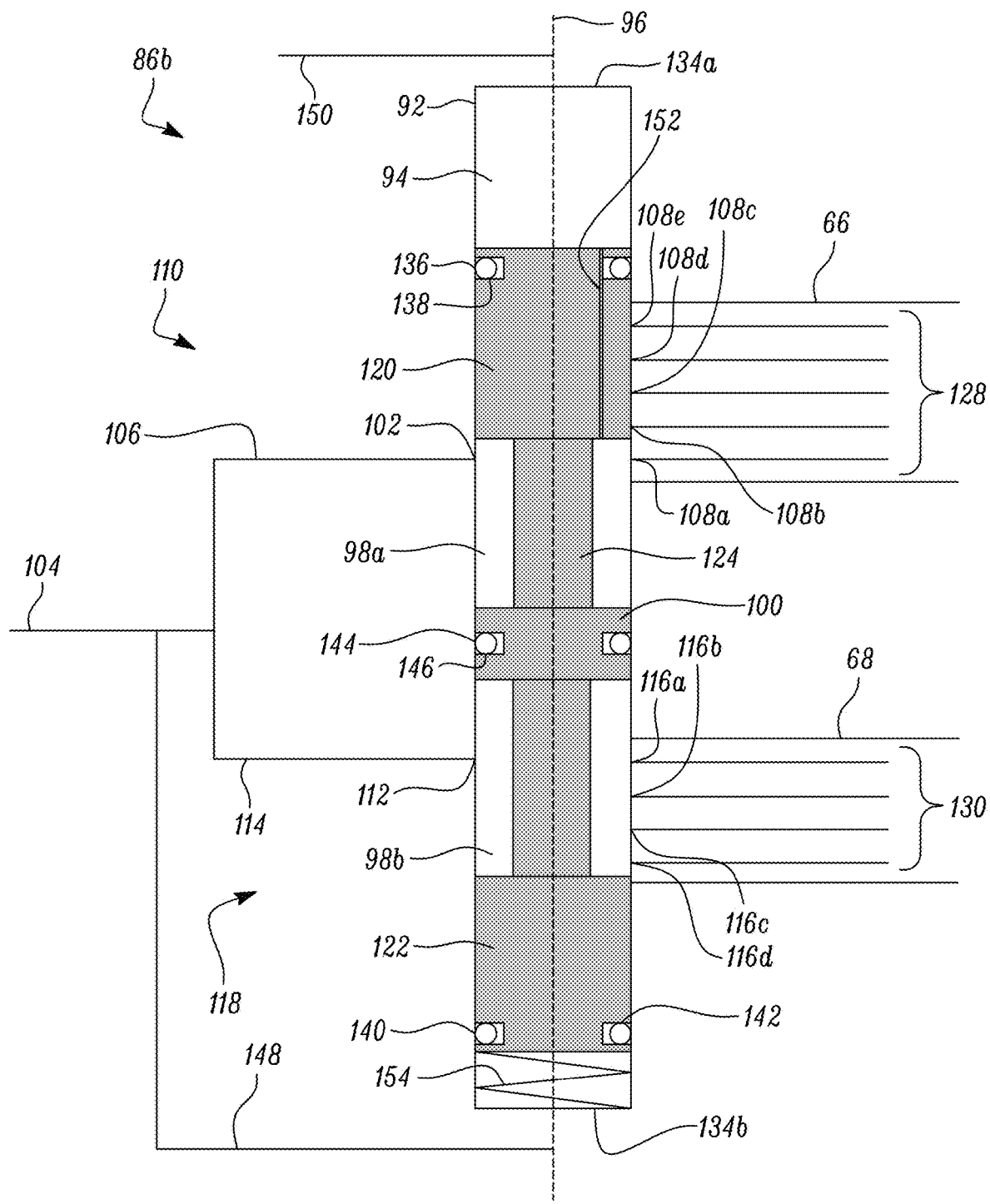
FIG. 7B illustrates the second example of the staging valve of the nozzle of FIG. 5, in the second position.

FIGS. 7A to 7D illustrate a second example of the staging valve 86b. The second example valve 86b is similar to the first example valve 86a unless stated otherwise, and where appropriate, the same reference numerals are used. As shown in FIGS. 7A and 7B, first and second flow paths 110, 118 are defined in a similar manner to the example shown in FIGS. 6A and 6B

In this example, the first fuel flow path 110 includes a single first fuel passage 106 extending from the valve inlet 104 to a single pilot inlet port 102, with five pilot outlet ports 108a-e extending from the cavity 94 to the first fuel supply conduit 66. Similarly, the second fuel flow path 118 includes a single second fuel passage 114 extending from the valve inlet 104 to a single main inlet port 112, with four main outlet ports 116a-d extending from the cavity 94 to the second fuel supply conduit 68.

Figure 7C:
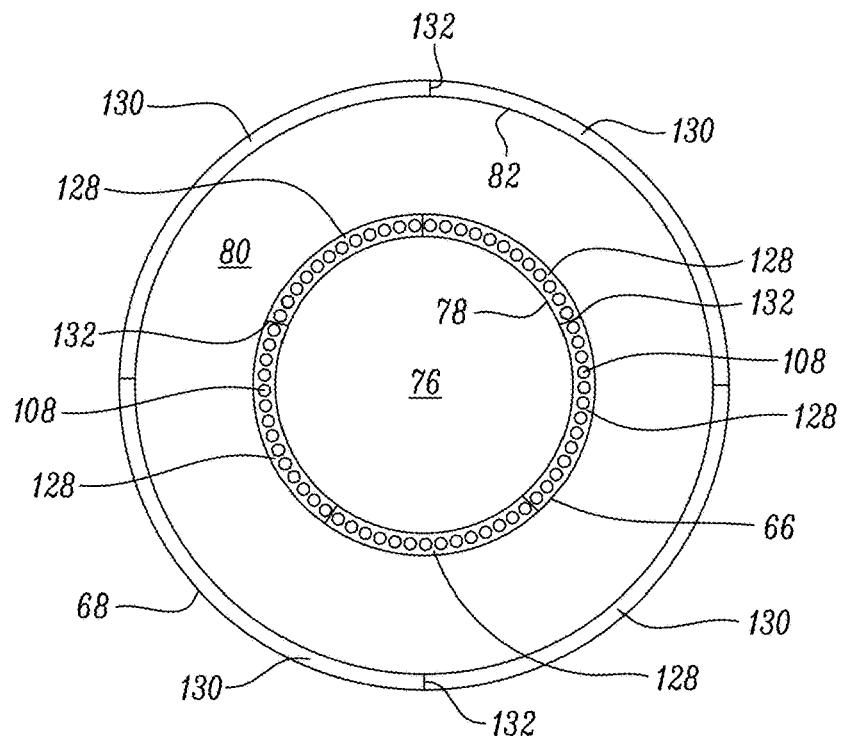
FIG. 7C illustrates a cross-section through the nozzle head of a nozzle including the staging valve shown in FIGS. 7A and 7B, taken at line X in FIG. 5, when the staging valve is in the first position.
Figure 7D:
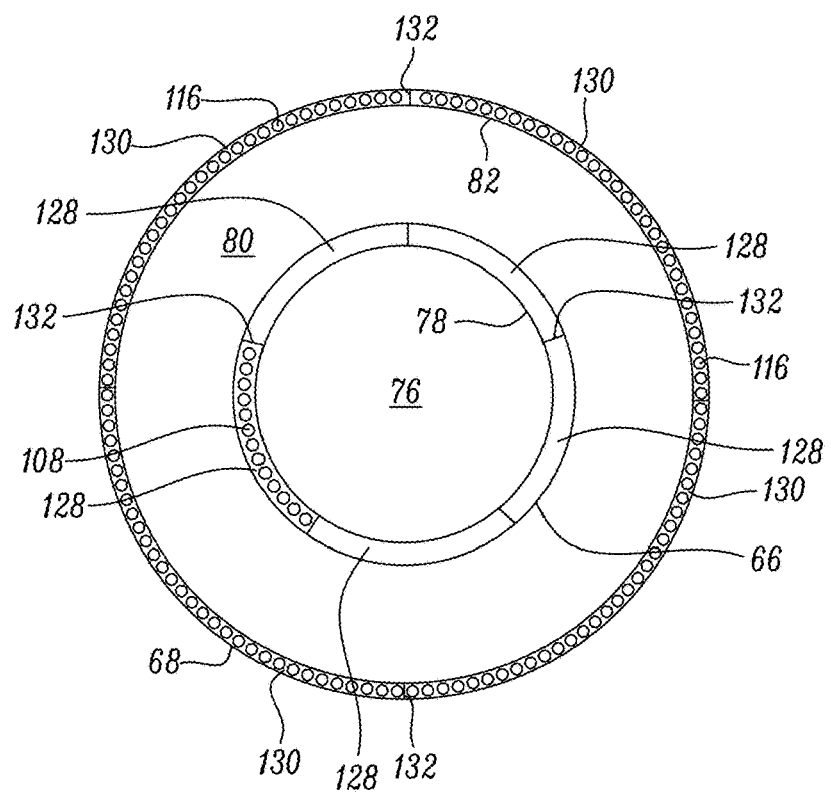
FIG. 7D illustrates a cross-section through the nozzle head of the nozzle including the staging valve shown in FIGS. 7A and 7B, taken at line X in FIG. 5, when the staging valve is in the second position.

The first fuel supply conduit 66 is split into five sectors 128 arranged around the circumference of the feed arm 62 and nozzle head 64. Each sector 128 is fed by a one of the pilot outlets 108a-e. Similarly, the second fuel supply conduit 68 is split into four sectors 130 arranged around the circumference of the feed arm 62 and nozzle head 64. Each sector 130 is fed by a one of the main outlets 116a-d. FIGS. 7C and 7D illustrate the sectors 128, 130 in more detail.

The inlets 102, 112 and outlets 108, 116 are arranged at diametrically opposed positions around the valve body 92, and the outlet ports 108, 116 are spaced along the valve body 92 in the axial direction 96.

The pilot outlet ports 108a-e are grouped together and the main outlet ports 116a-d are also grouped together. The pilot outlet ports 108 are spaced from the first end 134a of the cavity 94 in the axial direction 96, and the main outlet ports 116 are spaced from the second end 134b of the cavity 94 in the axial direction 96. The pilot outlet ports 108 and the main outlet ports 116 are also spaced from each other along the axial direction 96.

The pilot inlet port 102 is aligned in the axial direction 96 with the pilot outlet port 108a farthest from the first end 134a of the cavity 94. The main inlet port 112 is aligned in the axial direction 96 with the main outlet port 116a farthest from the second end 134b of the cavity 94.

Closing members 120, 122 are again provided in a similar manner to the valve 86a shown in FIGS. 6A and 6B. As in the example shown in FIGS. 6A and 6B, the closing members 120, 122 are linked by a linking member 124, and a collar 100 is formed on the linking member 124 to split the cavity 94 into two chambers 98a, b. The closing members 120, 122 are able to move in the axial direction 96 such that a change in the number of open pilot outlet ports 108a-e causes a complementary or corresponding (opposite) change in the number of main outlet ports 116a-d open.

The size and spacing of the pilot outlet openings 108a-e is the same as the size and spacing of the main outlet openings 116a-d. Therefore, as the closing members 120, 122 move, the overall flow (and hence the flow number or overall restriction) through the valve 86b is constant, since the flow through each outlet 108a-e, 116a-d is the same, and the same number of outlet ports 108a-e, 116a-d is open. However, the relative proportions of the flow to the first fuel supply conduit 66 and second fuel supply conduit 68 varies.

As in the first example, there are a number of different control parameters associated with the size and shape of the closing members 120, 122, collar 100 and chambers 98a, b that can determine the range of flow possible through the valve 86b. These include:

Axial spacing of the pilot outlet ports 108 from the first end 134a of the cavity 94;
Axial spacing of the main outlet ports 116 from the second end 134b of the cavity 94;
Axial spacing between the pilot outlet ports 108 and the main outlet ports 116;
Axial length of the first closing member 120;
Axial length of the second closing member 122;
Axial length of the collar 100;
Axial spacing between the first closing member 120 and collar 100; and
Axial spacing between the second closing member 122 and collar 100.

By choice of these control parameters at least one of the pilot outlet ports 108a, and the pilot inlet port 102 is always open, such that there is always flow to the pilot burner 70. However, the flow to the main burner 72 can range between all outlet ports 116 closed, and all outlet ports 116 open.

Using the examples shown in FIGS. 7A and 7B, with five pilot outlet openings 108a-e and four main outlet openings 116a-d, the valve 86b may be operated between the following configurations:

|   | Pilot outlet ports open | Main outlet ports open | Relative flow to pilot burner | Relative flow to main burner | FIG. |
|---|---|---|---|---|---|
| A | 5 | 0 | 100 | 0 | 7A |
| B | 4 | 1 | 80 | 20 | |
| C | 3 | 2 | 60 | 40 | |
| D | 2 | 3 | 40 | 60 | |
| E | 1 | 4 | 20 | 80 | 7B |

In order to ensure a reasonable circumferential distribution of the fuel, the sectors 128, 130 of the fuel supply conduits 66, 68 may optionally open into each other before a downstream end of the nozzle head 64.

The pilot and main sectors 128, 130 may be arranged such that each of the sectors 128, 130 has an equal flow through it. For example, the size, and/or position in the cavity 94 of the outlet openings 108, 116 and/or the number of outlet openings 108, 116 opening in to each sector 128, 130 may be controlled to ensure each sector has equal flow. The closing members 120, 122 may be arranged such that sectors 128, 130 are only completely open or completely closed, and that the total number of sectors 128, 130 that are open is constant, whilst the number of pilot sectors 128 and main sectors 130 that are open varies.

FIGS. 7C and 7D show a cross-section through the nozzle head 64 of a nozzle 60 including the staging valve 86b discussed in relation to FIGS. 7A and 7B. As can be seen, the sectors 128, 130 are formed by dividing walls 132. In this example, each sector 128, 130 includes a number of outlet openings 108, 116 from the valve 86b. Although the outlet openings 108, 116 may be formed at the top of the feed arm 62, into the separate sectors 128, 130, they are shown on FIGS. 7C and 7D for illustrative purposes. Based on this, the valve 86b may be operated between the following configurations:

|   | Pilot sectors open | Main sectors open | Relative flow to pilot burner | Relative flow to main burner | FIG. |
|---|---|---|---|---|---|
| A | 5 | 0 | 100 | 0 | 7C |
| B | 4 | 1 | 80 | 20 | |
| C | 3 | 2 | 60 | 40 | |
| D | 2 | 3 | 40 | 60 | |
| E | 1 | 4 | 20 | 80 | 7D |

In the example shown in FIGS. 7A to 7D, each sector 128 of the first fuel supply conduit 66 is coupled to a single pilot outlet 108 and each sector 130 of the second fuel supply conduit 68 is coupled to a single main outlet 116. This is by way of example only. It will be appreciated that each sector 128, 130 may be provided with any number of outlet openings 108, 116.

Any suitable control means may be used to actuate the closing members 120, 122 of the valves 86 discussed above.

In one example, the valves 86 may be actuated using fuel pressure. In such an example, a pump (not shown) may tap into the fuel line after the metering valve 56. The pump may be driven electrically or by hydraulic fuel pressure. A controller (not shown) drives the pump to pressurise the fuel to provide a servo flow 150. The servo flow 150 is provided to each valve 86, via its own manifold (not shown), to actuate the closing members 120, 122.

The servo flow 150 is provided to an opening in the first end 134*a* of the cavity 94. At the second end 134*b* of the cavity, a spring 154 is provided. The pressure of the servo flow 150 acts to move the closing members 120, 122 in a first axial direction, whilst the spring 154 acts in the opposite axial direction. In the absence of servo pressure, the spring 154 causes the valve 86 into the position shown in FIG. 6A or 7A. Increased servo pressure forces the closing members 120, 122 to move axially downward.

When the servo flow 150 is provided to the first end 134*a* of the valve body 92, the first closing member 120 includes a through passage 152, so that fuel from the servo flow 150 can pass into the pilot outlet 66. This ensures that the servo flow 150 is kept moving to avoid the presence of hot stagnant fuel which can lead to pipe blockage due to fuel carbonisation.

The control of the servo flow 150 and the spring 154 may optionally be used to limit the travel of the closing members 120, 122, in addition to or instead of control of the other control parameters discussed above.

Alternatively, the closing members 120, 122 may be actuated by any alternative actuator. For example, a stepper motor may be provided on each valve 86.

In the above examples, the first and second chambers 98*a, b* are formed by a collar 100 on the linking member 124 between the closing members 120, 122. In other examples, the valve body 92 may include a fixed dividing wall (not shown) to split the cavity 94 in to two chambers 98*a, b*. The linking member 124 may pass through an opening in the wall, which may be sealed.

In the above examples, both the pilot and mains flow paths 110, 118 are arranged in a similar manner. However, in a further example, the valve body 92 may be arranged such that the one of the flow paths 110, 118 includes an array of inlets 102, 112 and a single outlet 108, 116, whilst the other flow path 110, 118 includes a single inlet 102, 112 and an array of outlets 108, 116. In the manner discussed above, the closing members 120, 122 may restrict the fuel flow through the flow paths.

In yet a further example, each flow path 110, 118 may have a single inlet port 102, 112 and a single outlet port 108, 116, and the closing members 120, 122 may partially close one or both of the inlet ports 102, 112, and outlet ports 108, 116 to restrict the flow paths and provide fully variable control of the flow to the first and second supply conduits 66, 68 rather than the discrete control described in other examples.

It will be appreciated that to ensure even supply of fuel around the combustion chamber 52, each fuel spray nozzle 60 should be controlled to have the same mix. However, in some examples, this may not be the case, and different nozzles 60 may be controlled differently. In the examples discussed above, the total flow through the nozzle 60 (the sum of the flow to the two burners 70, 72) is the same no matter what the position of the closing members 120, 122. Therefore, where different nozzles 60 in the system 50 provide different relative flows from the pilot and main burners 70, 72 (either by control or if a valve 86 breaks) hot spots do not form in the engine due to oversupply of fuel.

In the examples discussed above, the valve 86 provides a first fluid flow path 110 to the pilot burner 70 and a second fluid flow path 118 to the main burner 72. The valve 86 further provides a control point in each flow path 110, 118 where the relative flow in each path can be controlled or modified.

In all cases, the control point provides for a constriction in the path that has variable cross-sectional area to control the flow of fluid. The cross-section is varied by opening and closing inlet ports 102, 112, or outlet ports 108, 116 using closing members 120, 122.

It will be appreciated that the valves 86 discussed above are given by way of example only. Any suitable valve may be used to vary the relative flows to the pilot burner 70 and main burner 72, whilst maintaining the overall fuel flow.

The valve body 92 may have any suitable shape and orientation with the nozzle 60.

The seals 136, 140, 144 discussed above are piston type seals. It will be appreciated that this is by way of example only. Any suitable seal may be used.

Also the bypass conduit 148 to prevent hydraulic lock is given by way of example only. Any suitable means to prevent hydraulic lock may be used.

In the example shown in FIGS. 6A and 6B, the valve 86*a* includes five pilot inlets 102, and four main inlets 112. This is by way of example only, and there may be any number of inlets 102, 112. Furthermore, in this embodiment, the valve 86*a* may include two or more outlets 108, 116 in each flow path 110, 118. In some cases, moving the closing members 120, 122 may not close the outlets 108, 116 until one of the flow paths 110, 118 is fully closed. In other cases, the outlets 108, 116 in a chamber 98*a, b* may be left open, even when all corresponding inlets 102, 112 are closed.

Similarly, in the example shown in FIGS. 7A and 7B, there may be any number of outlets 108, 116 and any number of inlets 102, 112. Again, in some cases, moving the closing members 120, 122 may not close the inlets 102, 112 until one of the flow paths 110, 118 is fully closed. In other cases, the inlets 102, 112 in a chamber 98*a, b* may be left open, even when all corresponding outlets 108, 116 are closed.

The closing member may open and close outlets 108, 116 and inlets 102, 112 at the same time, in order to control flow through the flow paths 110, 118, rather than closing only outlets 108, 116 or inlets 102, 112, as discussed above.

Any suitable closing members 120, 122 may be used to close the outlets 108, 116 and inlets 102, 112. In the above example, the closing members 120, 122 occupy the full width of the cavity 94, however, this is by way of example only, and the closing members 120, 122 may only occupy part of the width. Also, although the above example includes closing members 120, 122 that move in an axial direction 96, the closing members 120, 122 may rotate around the axial direction 96 to open and close inlet ports 102, 112 and outlet ports 108, 116.

In the examples discussed above, five separate configurations may be provided, and the valve is controlled to step through the different configurations. As the number of inlets 102, 112 and/or outlets 108, 116 increases, further configurations are possible, and the valve 86 may be controlled to step through the different configurations.

Alternatively, even with a larger number of inlets 102, 112 and/or outlets 108, 116, the valve 86 may only be controlled to step through a small number of configurations, such that a number of the inlets 102, 112 and/or outlets 108, 116 may be closed at once to cause a step change.

In yet further examples, further granularity may be provided over the range of operation of the valve by arranging the closing members 120, 122 to partially open or close the inlets 102, 112 and/or outlets 108, 116. In some examples, the valve 86 may be continuously variable between the two extreme configurations discussed above (A and E), rather than providing steps between the configurations.

In the examples discussed above, the range of flows possible through the valve 86 (the operational range of the valve 86) extends from 100% pilots and 0% mains to 20% pilots and 80% mains. It will be appreciated that this is by way of example only. The upper limit of operation may extend up to 10% pilots and 90% mains in some examples. In other examples, any suitable configurations may be used as the upper and lower operational limits of the valve 86. It will be appreciated that the limits may be set by the control of the valves 86, or by the design control parameters being determined to physically restrict the closing members 120, 122, as discussed above.

It will be appreciated that the fluid tight seal between the first chamber 98a and second chamber 98b ensures that, when the valve 86 is operated at 100% pilots, no fuel is passed to the main burner 72.

In the example discussed in relation to FIGS. 7A to 7D, there are five pilot sectors 128, and four main sectors 130. It will be appreciated that this is by way of example only.

Furthermore, the separate sectors 128, 130 are distributed around the circumference of the nozzle 60. It will be appreciated that this is by way of example only. In some examples, each sector may extend around the circumference of the nozzle 60.

In the example shown in FIGS. 7A to 7D, the outlets 108a-e, 116a-d extend into separate sectors formed by dividing walls 132. In other examples, passages (not shown) may extend from each outlet 108a-e, 116a-d through the nozzle 64, the passages combining to form the fuel supply conduits 66, 68.

In the above examples a variable constriction is provided to control the flow through fuel flow paths 110, 118. It will be appreciated that other constrictions may be provided within the manifold 58 or nozzle 60, in order to provide desired effects into the fluid flow. These constrictions are fixed, and are not used to vary the relative flow through the flow paths 110, 118.

The fuel supply system 50 discussed above is given by way of example only. It will be appreciated that any suitable fuel supply system may be provided. In the examples discussed above, the servo flow 150 is provided by a single manifold (not shown). However, in other examples, the system 50 may be provided with multiple manifolds (not shown) to provide servo flow 150. Each servo manifold may deliver servo flow 150 to a subset of the nozzles 60. This allows the valves 86 in the different subsets to be controlled differently, and provide different mixes of flow. In one example, the nozzles 60 may be sequentially numbered and the valve 86 of odd numbered nozzles 60 may be supplied by a first servo manifold whilst the valves 86 of even numbered nozzles may be supplied by a second servo manifold. This provides greater control over the combustion in the engine 10.

There may be any number of servo manifolds, controlled in any suitable manner. For example, to assist engine start-up procedures and/or protect against weak extinction of the flame, the nozzles 60 in the proximity of the engine igniters (not shown), which provide the initial spark in engine start up, may be controlled differently to the other nozzles 60 in the combustion equipment 16.

The structure of the nozzle 60 given above is by way of example only. It will be appreciated that the valves 86 discussed above may be used with any suitable lean burn nozzle structure, and the fuel supply system 50 may also be implemented with any suitable nozzle structure.

In the above description, it is noted that the total flow through the valve 86 is the same no matter what the position of the valve 86. It will be appreciated that this is for a fixed supply from the meter valve 56. Where the meter valve 56 alters the supply to the manifold 58, the flow will change. However, each nozzle 60 in the system 50 will still have the same total flow as each other, as the flow through the staging valve 86 is independent of the position of the staging valve 86.

In some examples, the staging valve 86 may be arranged so that there is some small variation in the total flow for different configurations (i.e. different positions of the closing members 120, 122). However, it will be appreciated that in such cases, the total flow is still substantially constant in the different configurations, and any variations are not sufficient to cause hazardous sector over-fueling i.e. hot-spots within the combustion chamber 52.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fuel spray nozzle for a gas turbine engine, the fuel spray nozzle arranged to mix fuel and air and provide the mixture to a combustor of the engine and including:
   a first fuel supply conduit arranged to provide fuel to be mixed with air in a first ratio;
   a second fuel supply conduit arranged to provide fuel to be mixed with air in a second ratio, having a lower proportion of fuel than the first ratio; and
   a staging valve arranged to control the relative proportions of fuel provided through the first fuel supply conduit and the second fuel supply conduit, such that an increase or decrease in the flow in the first fuel supply conduit is accompanied by a corresponding decrease or increase in the flow in the second fuel supply conduit, wherein
   the staging valve is arranged to control the relative proportions of fuel provided through the first fuel supply conduit and the second fuel supply conduit to maintain a total flow of fuel as constant or substantially constant, and
   the staging valve comprises:
      a first fuel flow path between a valve inlet for receiving fuel and the first fuel supply conduit, the first fuel flow path having a first control region having a first cross-sectional area through which fuel flows;
      a second fuel flow path between the valve inlet and the second fuel supply conduit, the second fuel flow path having a second control region having a second cross-sectional area through which fuel flows;
      a first closing member
      a second closing member;
      a first chamber between the valve inlet and the first fuel supply conduit, defining the first control region and receiving the first closing member, the first chamber having a plurality of first ports; and
      a second chamber between the valve inlet and the second fuel supply conduit, defining the second control region and receiving the second closing member, the second chamber having a plurality of second ports,
   the first closing member is configured to vary the first cross-sectional area by opening and closing the first ports;

the second closing member is configured to vary the second cross-sectional area by opening and closing the second ports; and the first and second closing members are configured such that a combined number of the first ports and the second ports that are open remains the same over a complete range of movement of the first and second closing members.

2. The fuel spray nozzle of claim 1, wherein the first and second closing members are linked such that actuating the valve to increase the first cross-sectional area is accompanied by a corresponding reduction in the second cross-sectional area, and actuating the valve to decrease the first cross-sectional area is accompanied by a corresponding increase in the second cross-sectional area.

3. The fuel spray nozzle of claim 1, wherein the first closing member is actuable across a first range of movement to vary the first cross-sectional area, and the second closing member is actuable across a second range of movement to vary the second cross-section area.

4. The fuel spray nozzle of claim 1, including:
a valve body defining a cavity; and
a dividing member splitting the cavity into two parts, forming the first and second chambers.

5. The fuel spray nozzle of claim 4, including a linking member rigidly joining the first closing member and the second closing member, wherein the dividing member is formed on the linking member.

6. The fuel spray nozzle of claim 1, wherein:
the first fuel supply conduit is split into one or more first sectors, each first sector associated with one or more first outlet port;
the second fuel supply conduit is split into one or more second sectors, each second sector associated with one or more second outlet port; and
wherein the first and second closing members are arranged to maintain a constant number of sectors open at any position of the first and second closing members.

7. The fuel spray nozzle of claim 6, wherein each sector comprises a plurality of ports distributed around a circumference of the fuel spray nozzle.

8. The fuel spray nozzle of claim 1, wherein the staging valve is actuable to modify the proportions of the flow through the first fuel supply conduit and the second fuel supply conduit between ratios of 100:0 and 10:90.

9. A fuel supply system for a gas turbine engine, the fuel supply system including:
two or more fuel spray nozzles according to claim 1; and
a fuel manifold arranged to deliver fuel to the first fuel supply conduits and second fuel supply conduits of the fuel spray nozzles.

10. The fuel supply system of claim 9, including a metering valve arranged to control the total flow of fuel into the manifold.

11. A gas turbine engine for an aircraft, the gas turbine engine comprising:
an engine core comprising a compressor arranged to compress air passing through the engine core, a combustor arranged to burn fuel in the compressed air, a turbine driven by expansion of combustion products from the combustor and a core shaft connecting the turbine to the compressor, to drive the compressor;
a fan located upstream of the engine core, the fan driven by the core shaft and comprising a plurality of fan blades; and
a fuel supply system as claimed in claim 9, arranged to mix fuel with compressed air from the compressor, and deliver the mixture to the combustor.

12. The gas turbine engine of claim 11, including a gearbox that receives an input from the core shaft and outputs drive to the fan so as to drive the fan at a lower rotational speed than the core shaft.

13. The gas turbine engine of claim 11, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

* * * * *